United States Patent [19]

Leali

[11] Patent Number: 5,793,481
[45] Date of Patent: Aug. 11, 1998

[54] SYSTEM, METHOD AND DEVICE FOR MONITORING A FIBER OPTIC CABLE

[75] Inventor: Sergio Leali, Barlassina, Italy

[73] Assignee: PLLB Elettronica S.p.A., Milan, Italy

[21] Appl. No.: 704,669

[22] PCT Filed: Sep. 15, 1995

[86] PCT No.: PCT/IT95/00150

§ 371 Date: Nov. 13, 1996

§ 102(e) Date: Nov. 13, 1996

[87] PCT Pub. No.: WO97/10651

PCT Pub. Date: Mar. 20, 1997

[51] Int. Cl.⁶ .................................................. G01N 21/00
[52] U.S. Cl. .................... 356/73.1; 356/432; 356/128
[58] Field of Search .................... 356/73.1, 432, 356/128

[56] References Cited

U.S. PATENT DOCUMENTS

| | | |
|---|---|---|
| 4,183,666 | 1/1980 | Tahara et al. |
| 4,600,310 | 7/1986 | Cramp et al. ............... 356/432 |
| 5,535,139 | 7/1996 | Barringer et al. ............ 364/550 |

FOREIGN PATENT DOCUMENTS

| | | | |
|---|---|---|---|
| 62-137535 | 6/1987 | Japan ............ | G01N 11/02 |
| 3-053141 | 3/1991 | Japan ............ | G01M 11/02 |

*Primary Examiner*—Frank G. Font
*Assistant Examiner*—Reginald A. Ratliff

*Attorney, Agent, or Firm*—Limbach & Limbach L.L.P.; Seong-Kun Oh

[57] ABSTRACT

The invention relates to a system for monitoring a fiber optic cable (2) connected between optical signal transmitting (TX) and receiving (RX) equipment, and comprising first (3) and second (4) electro-optical devices for measuring optical power being both connected to a central control unit (14) over a bus (13) and permanently connected to the beginning and the end, respectively, of the fiber optic cable (2), at said transmitting (TX) and receiving (RX) equipment.

The invention also relates to a compact electro-optical device (3) for measuring the operating optical power (P) of a fiber optic cable (2), having an optic input (5) and optic output (7), as well as an electric input (9) and electric output (11) and being of the type which comprises an optical power measuring circuit (20) having an input (19) connected to the optic input (5) and an output (21) connected to the electric output (11). The measuring device (3) further comprises an optical splitter (15) connected between the optic input (5) and the optic output (7).

The optical splitter (15) has a secondary output (16) connected, through an electro-optical detector (17), to the optical power measuring circuit (20) and separates, on the secondary output (16), a fraction ($P_{TX}$) of the operating optical power (P) according to a predetermined splitting ratio (RR). The fraction ($P_{TX}$) of the operating optical power is processed by the optical power measuring circuit (20) and presented at the electric output (21) of the measuring circuit.

27 Claims, 4 Drawing Sheets

5,793,481

SYSTEM, METHOD AND DEVICE FOR MONITORING A FIBER OPTIC CABLE

DESCRIPTION

1. Field of the Invention

The present invention relates to a system for monitoring a fiber optic cable.

Specifically, the invention concerns a system for monitoring a fiber optic cable connected between a transmitting equipment and a receiving equipment of optical signals, which system is connected to a central control unit through a bus and comprises compact electro-optical devices for measuring optical power which are permanently connected to the opposite ends of the fiber optic cable.

The invention further relates to a method of monitoring a fiber optics link which includes the above monitoring system.

The invention further relates to a compact electro-optical device for measuring optical power which is adapted to be permanently connected to a network of fiber optic cables, which devices have an optic input and an optic output as well as an electric input and an electric output, and are of a type which comprises an optical power measuring circuit having an input connected to the optic input and an output to the electric output, the electric output providing the value of the operating optical power being flowed through the fiber optic cable.

2. Background Art

As is well known, fiber optic cables are widely used in telecommunications networks. Information exchanged on such optical carriers can improve the overall quality of telecommunications systems and their operational speed.

In the specific field of this invention, a need exists for a quick troubleshooting procedure.

Of special interest is an ability to prevent the occurrence of failures by spotting variations in the attenuation through each fiber optic cable, regarded as a sure indication of a deteriorating cable link.

For the purpose, arrangements for monitoring fiber optic cable systems have been available which can provide useful information to the evaluation of the cable characteristics.

A first prior art solution provides a measurement of the attenuation through a fiber optic cable "out-of-service", that is: a cable which has been disconnected from the equipment to which it is normally connected.

This prior solution consists of using a measuring system which simulates a transmitter/receiver system and inputs a test signal to the fiber optic cable. The cable performance can be checked upon measuring the transmitted and received signals.

However, this first solution does not allow the performance of fiber optic cables "in-service", that is during their normal operation, to be checked. In addition, the monitoring of each cable and the network as a whole is time consuming.

A second prior art solution provides a measurement of the attenuation through a fiber optic cable using a reflectometer or OTDR (Optical Time Domain Reflectometer).

The reflectometer is connected to a first end of a fiber optic cable and caused to send an optical test signal therethrough.

From this first end, the strength and time of arrival of the optical wave reflected back through the cable are measured; from these values, one can work back to the attenuation value of the fiber optic cable and/or the location of a possible fault.

Measurements with an OTDR test set are easily made on "out-of-service" cables, and are feasible on cables in operation.

In the latter case, the optical test signal is added to the operating optical signal by means of a suitable optical coupler. It is on this account that the wavelength of the optical test signal and that of the operating optical signal must lie far apart, so as to minimize interference on said signal.

Although achieving its objective, not even this second prior solution is entirely devoid of drawbacks, a major one being the bulk and high cost of an OTDR test set.

Due to these limitations, one OTDR test set is usually shared by a plurality of cables which, therefore, can only be monitored on a cyclic basis. This involves, the use of a large number of optical switches.

In addition, the presence of two optical signals with discrete wavelengths may cause noise to appear at the receiving end which cannot be completely suppressed using an optical filter.

The technical problem underlying this invention is to provide an electro-optical measuring device, and relating system for the continual monitoring of a fiber optic cable, which have such constructional and functional features as to overcome the drawbacks with which prior art monitoring systems are still beset.

SUMMARY OF THE INVENTION

The solvent idea on which this invention is predicated is that of providing for continual measurement over time of the attenuation of a fiber optic, using compact electro-optical measuring devices which are permanently installed at the ends of the fiber optic.

Based on the above solvent idea, the technical problem is solved by a system for monitoring a fiber optic cable connected between a transmitting equipment and a receiving equipment.

The technical problem is also solved by a method of monitoring a fiber optic cable, wherein the attenuation through the fiber is found by measuring predetermined fractions of the optical power propagated through the fiber, at the beginning and the end of the fiber.

The problem is further solved by the use of electro-optical devices for measuring optical power, which are provided in a highly compact form and tap off predetermined fractions of the operating optical signal at the beginning and the end of a fiber under test to calculate the average value of the power propagated through the fiber, as defined in claim 15.

The features and advantages of the monitoring system and the electro-optical measuring devices of this invention will be apparent from the following detailed description of embodiments thereof, given by way of non-limiting example with reference to the accompanying drawings.

DETAILED DESCRIPTION

Figure 1:
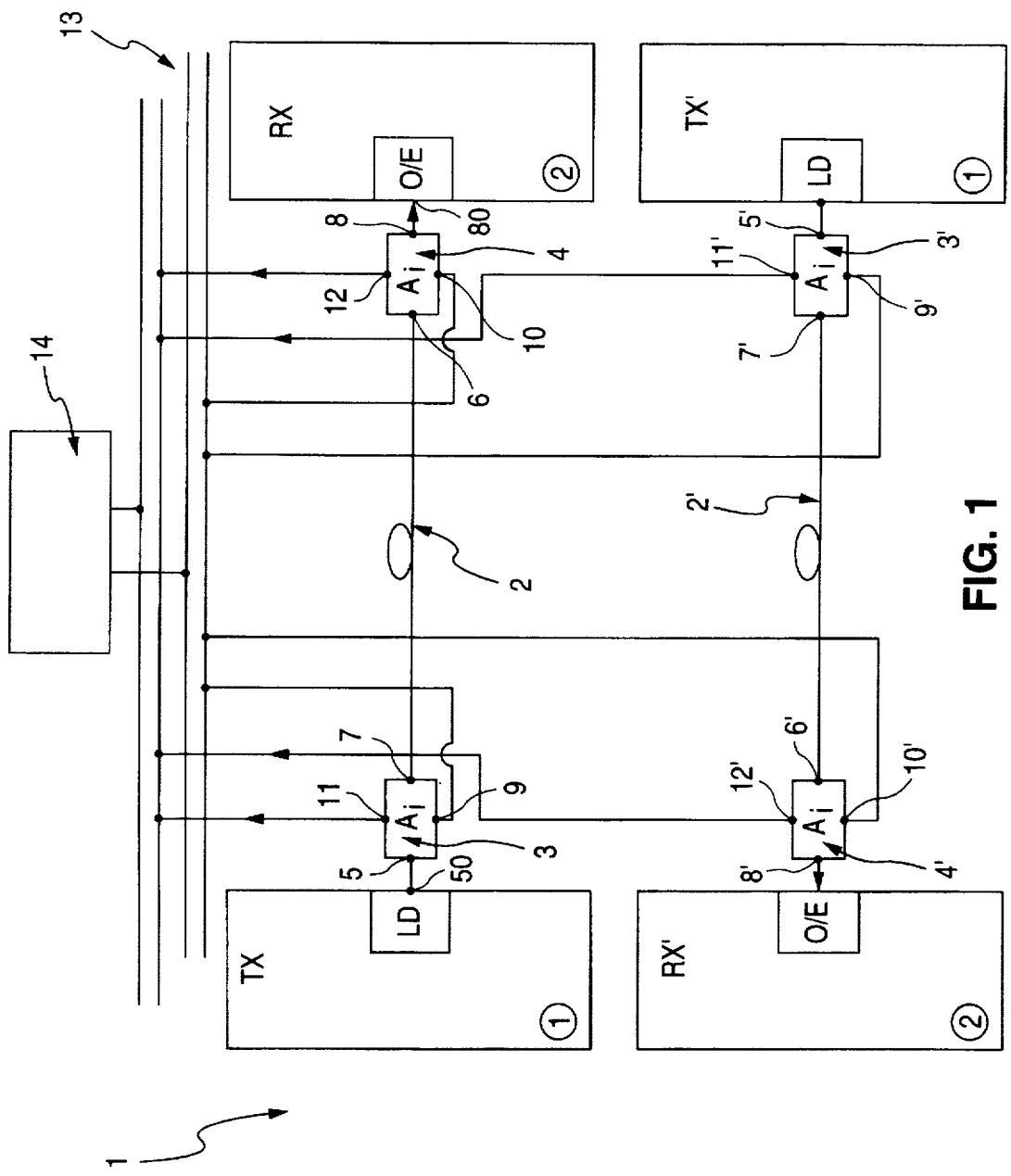
FIG. 1 is a diagrammatic view of a monitoring system of a bidirectional connection of fiber optic cables according to the invention.

Referring to the figures, generally shown at 1 is a system for monitoring a bidirectional connection of fiber optic cables 2 laid between a transmitting equipment TX and a receiving equipment RX.

In particular, the fiber optic cables 2 are connected to an optic input 80 of an optic/electric converter O/E included in the receiving equipment RX and an optic output 50 of a laser transmitter LD included in the transmitting equipment TX.

The most straightforward monitoring method of checking attenuation through a fiber optic cable 2 is to calculate the ratio (or the difference if the values are expressed in dBm) between a value of the transmitted operating optical power $P_T$ and a corresponding value of the received operating optical power $P_R$.

Advantageously, in the method according to the invention, this ratio between optical powers is provided on fractions, $P_{TX}$ and $P_{RX}$, of the overall optical power flowing through the fiber optic cable 2, to which the fractions stand in a predetermined fixed splitting ratio, so that the value of the attenuation through the fiber optic cable can be correctly found.

To that aim, the monitoring system 1 comprises first 3 and second 4 electro-optical devices for measuring optical power which are respectively connected to the beginning and the end of the fiber optic cable 2, at the transmitting equipment TX and the receiving equipment RX.

The electro-optical devices 3 and 4 for measuring optical power have at least two optic inputs 5, 6 and at least two optic outputs 7, 8, as well as respective electric inputs 9, 10 and electric outputs 11, 12.

Specifically, the electro-optical measuring device 3 has its optic input 5 connected to the output 50 of the transmitting equipment TX and its optic output 7 to the fiber optic cable 2.

In a similar way, the electro-optical measuring device 4 has its optic input 6 connected to the fiber optic cable 2 and its optic output 8 connected to the input 80 of the receiving equipment RX.

Figure 2:
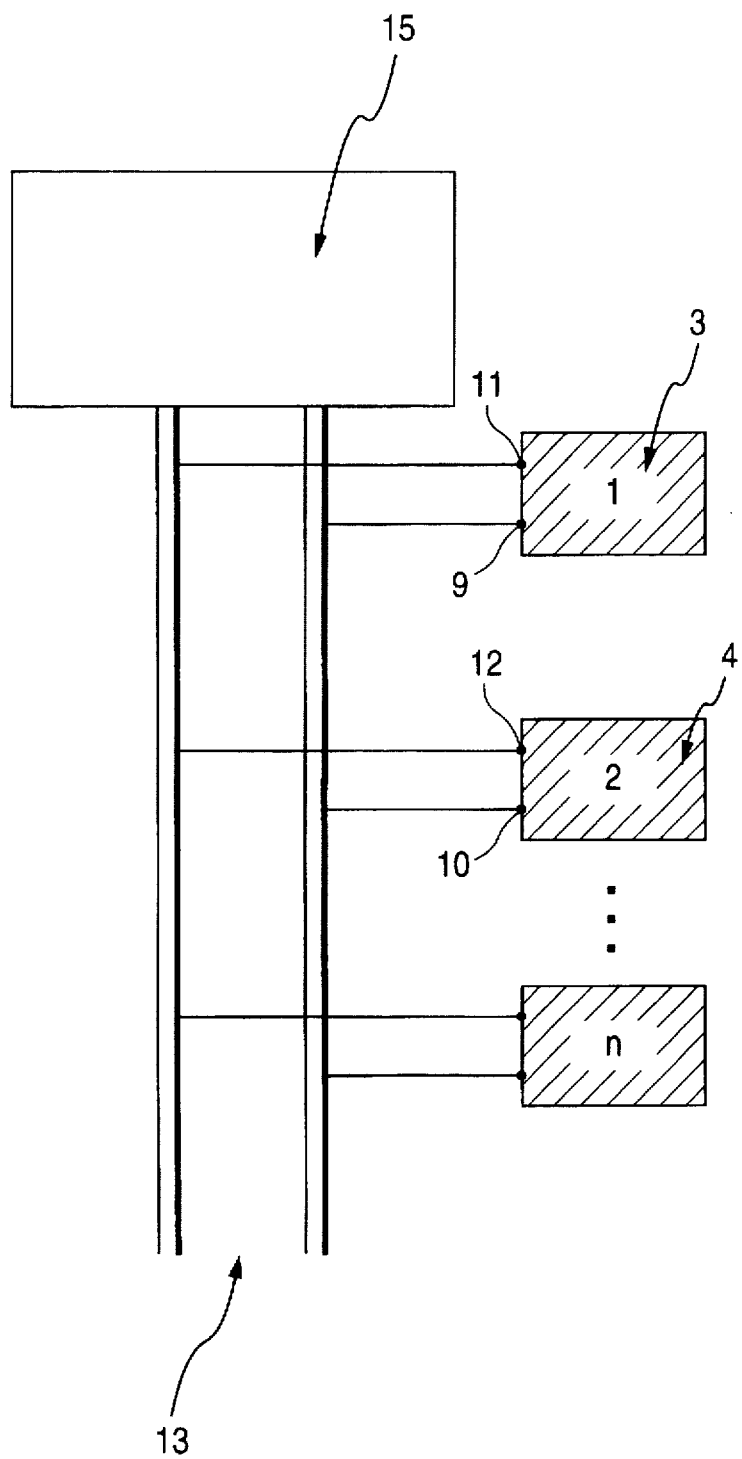
FIG. 2 is a diagrammatic view showing schematically the monitoring system of FIG. 1.

As shown in FIGS. 1 and 2, the monitoring system 1 is connected, through a bus 13, to a central control unit 14 which is external, or remotely located, from the monitoring system 1 and in which the attenuation through the fiber optic cable 2 is evaluated.

Figure 3:
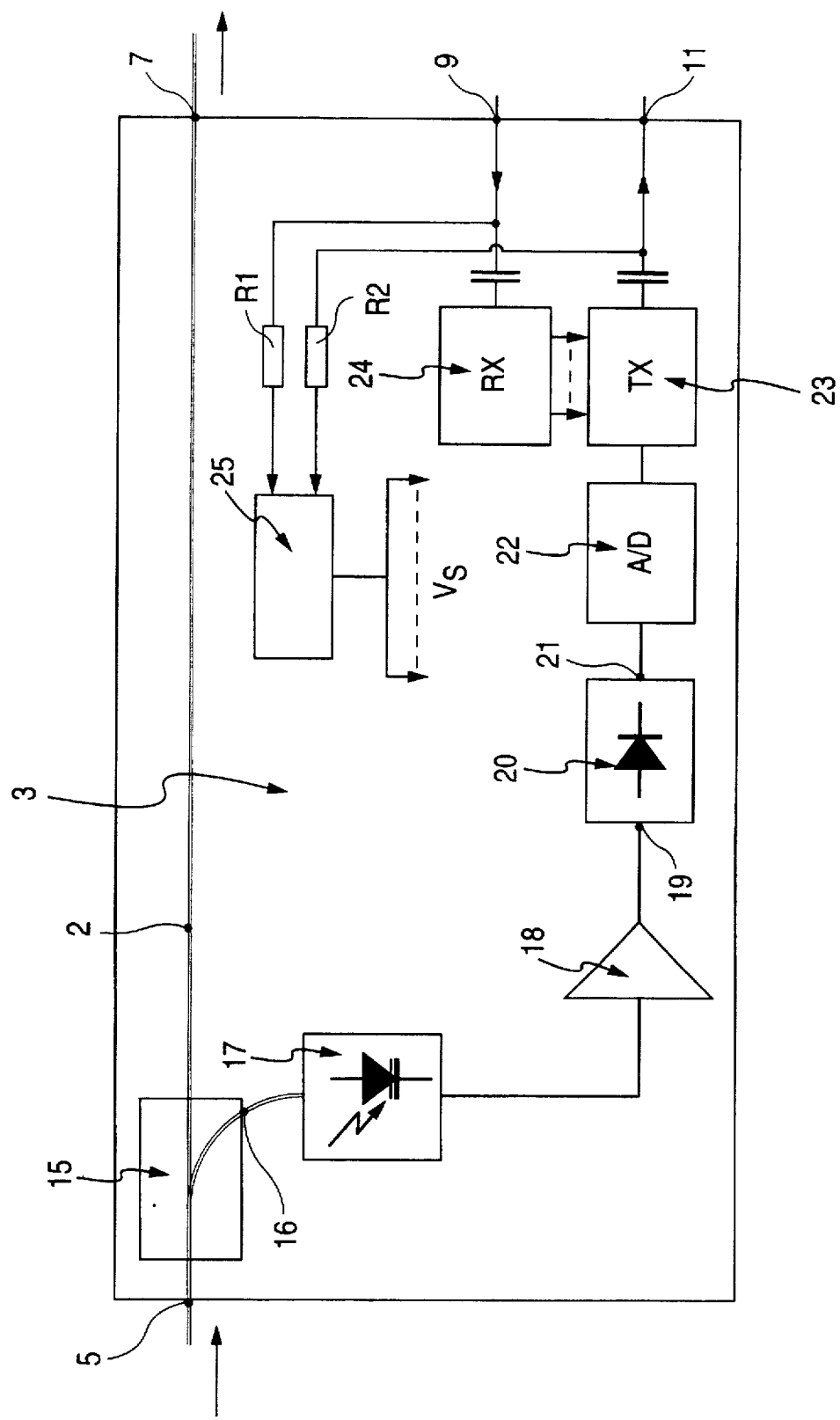
FIG. 3 shows diagramatically an electro-optical device for measuring optical power according to the invention, in a highly compact embodiment thereof.

Shown in FIG. 3 is a preferred embodiment of an electro-optical device for measuring optical power according to this invention, e.g. the device 3.

The electro-optical device 3 comprises an optical splitter 15 which is inserted between the optic input 5 and the optic output 7 and has a secondary output 16 connected to an electro-optical detector 17, which is, in turn connected to an input 19 of an optical power measuring circuit 20.

In particular, the optical splitter 15 taps, according to a predetermined splitting ratio RR, a fraction $P_{TX}$ of the operating optical power P off the output 50 of the transmitting equipment TX.

In a preferred embodiment, the optical splitter 15 is effective to split the optical power present on the optic input 5 between the optic output 7 and the secondary output 16, at a splitting ratio RR of 90:10.

Advantageously, the electro-optical device 3 uses an optical splitter 15 having a low power additional insertion loss, i.e. of less than 0.25 dB.

Advantageously, according to the invention, by the use of a high-sensitivity type of electro-optical detector 17 and a high-impedance pre-amplifier 18, the electro-optical device 3 is able to detect optical powers having a level lower than −50 dB.

Thus, the measuring circuit 20 will supply, on an output 21, the value of the optical power fraction PTX present on the input 19. The output 21 is connected to an analog-to-digital converter 22 which converts the value of the optical power fraction $P_{TX}$ into a binary code $DP_{TX}$ and transmits it, by means of a transmit protocol processor circuit 23, to the electric output 11 of the electro-optical measuring device 3, and thence to the central control unit 14.

The transmit protocol processor circuit 23 is connected, in a one way manner, to a receipt protocol processor circuit 24 which is, in turn connected to the electric input 9 of the electro-optical device 3 and to the central control unit 14.

The transmit protocol processor circuit 23 transmits, to the central control unit 14, the binary value of the outgoing optical power fraction measurement $DP_{TX}$ along with an identifying binary code $COD_3$ associated with the electro-optical measuring device 3 and recognizable by the central control unit 14. In a similar way, the receipt protocol processor circuit 24 can recognize the identifying binary code COD3 associated therewith and being transmitted from the central control unit 14.

Advantageously, according to the invention, the electro-optical measuring device 3 further includes a remote-powering circuit 25 which uses a DC value Ic, transmitted over the bus 13, to generate a voltage Vs effective to power the electro-optical measuring device 3.

Thus, additional devices can advantageously be connected to the bus 13 as adapted to the same function or to measure different magnitudes of the optical power, where all are remotely powered and controlled through the bus 13 itself.

The remote-powering circuit 25 is connected to the electric input 9 and the electric output 11 through a first resistor R1 and second uncoupling resistor R2, respectively. The uncoupling resistors, R1 and R2, separate all the useful electric signals, such as $COD_3$ or $DP_{TX}$, present on the bus 13 from the DC remote-powering current Ic.

The operation of the monitoring system 1 according to the invention will now be described.

The electro-optical measuring devices 3 and 4 are interrogated by the central control unit 14 using a polling or interrupt type of procedure. In either case, an identifying code COD3, COD4 is input to the electro-optical measuring devices 3, 4, which then outputs a binary value $DP_{TX}$, $DP_{RX}$ corresponding to the measured optical power fractions $P_{TX}$, $P_{RX}$, from the point where the electro-optical measuring devices 3, 4 are connected, and the identifying code $COD_3$ or $COD_4$ of the answering measuring device.

Particularly in the preferred embodiment of the invention, the exchange of information with the central control unit 14 takes place using a protocol of the serial type HDCL (High level Data Link Control), as is appropriate for a configuration of the monitoring system wherein the electro-optical measuring devices 3, 4 are connected to each other and to the central control unit 14 through a single bus 13.

Based upon the values of the received fractions of the optical power $DP_{TX}$ and $DP_{RX}$, the central control unit 14 calculate the attenuation through the fiber optic cable 2 and, accordingly, checks it for the performances or the possible faults.

In actual practice, telecommunications networks often use bidirectional links in the form of a pair of fiber optic cables 2, 2' connected to corresponding pairs of receiving RX, RX' and transmitting TX, TX' equipment, as shown in FIG. 1. The central control unit 14 would receive, in this case, pairs of binary values of incoming $DP_{RX}$, $DP'_{RX}$ and outgoing $DP_{TX}$, $DP'_{TX}$ optical power fractions, and evaluate the overall attenuations through the bidirectional links 2, 2' for both directions.

The monitoring system of this invention is also applicable to fiber optics transmissions with connections in a point-to-point unidirectional configuration or a point-to-multipoint unidirectional configuration.

Of special importance is the application of the monitoring system 1 to optical distribution networks with a tree type architecture. The highly complicated construction of the optical links in such networks requires, in fact, that any deterioration of which the variations of the attenuation in the flowing optical power through the connection is the most significant indication, be timely located therein.

It would also be possible to have the electro-optical measuring devices of this invention connected to the outputs of the optical amplifiers as well, used in the point-to-multipoint distribution networks, so as to improve the reliability of the whole system.

Figure 4:
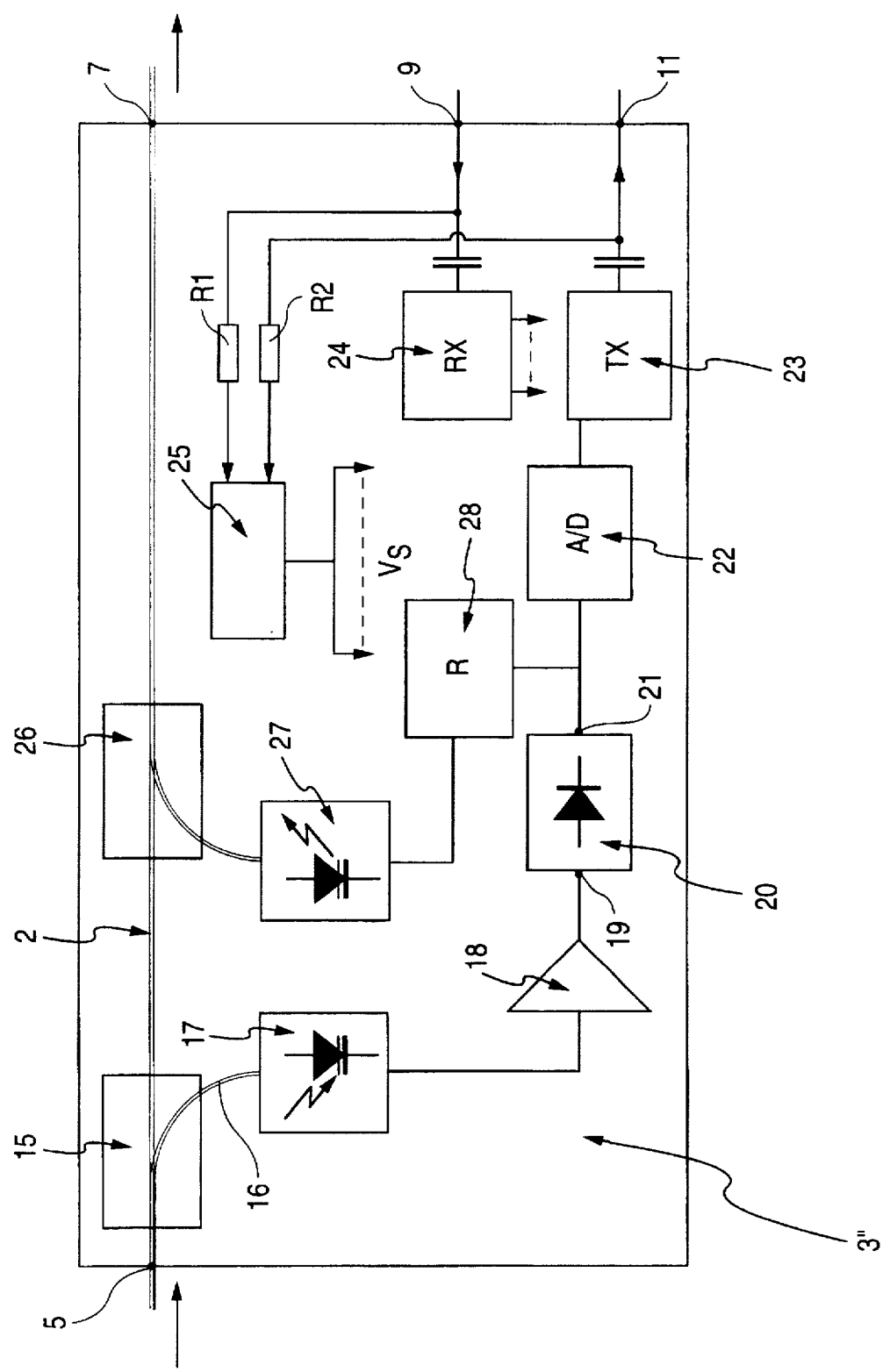
FIG. 4 shows diagrammatical a modified embodiment of an electro-optical device for measuring optical power according to the invention.

FIG. 4 illustrates a modified embodiment of an electro-optical measuring device 3" according to the invention which can be used at the output of transmitting equipment TX in telecommunications networks equipped with automatic optical protection for personal safety.

In such systems, the operating optical source, which supplies the operating optical power P and is connected within the transmitting equipment TX (and has been omitted from FIG. 4), is turned off automatically on the occurrence of an interruption in the fiber due to breakage or disconnection.

In a condition of no operating optical power P from the transmitting equipment TX, it is impossible to tell failures due to broken fiber optic cables (which would have caused the optical source of the transmitting equipment TX to go off) from failures which have occurred in the transmitting equipment TX itself.

To overcome this limitation, the electro-optical measuring device 3" further includes an optical coupler 26 connected across the optical splitter 15 and the optic output 7. The optical coupler 26 is used to add, to the operating optical signal with power P being propagated through the fiber optic cable 2, an auxiliary optical signal with power PA whose level lies below the danger threshold for any human operators of the system.

The optical coupler 26 is connected to an auxiliary optical source 27, such as a low-power optical transmitter or LED, or a low-power laser, which is, in turn connected to the output 21 of the measuring circuit 20 through a mean power detector 28.

The operation will now be discussed of this modified embodiment of the electro-optical measuring device 3" according to the invention.

Any time that there is no operating optical power P, the mean power detector 28 turns on the auxiliary optical source 27 to supply an auxiliary power PA, at a much lower level than the operating power, to the link formed by the fiber optic cable 2.

In this way, it becomes possible to discriminate among the following operational conditions:

Normal operation—The received optical power fraction $P_{RX}$ has a value close to that of a fraction FP of the operating power P obtained in conformity with the splitting ratio RR introduced by the optical splitter 15.

Cable failure—No received optical power fraction $P_{RX}$.

Transmitter failure—The received optical power fraction $P_{RX}$ has a reduced value determined by the auxiliary optical power PA.

The electro-optical measuring device 3" of this invention is, therefore, capable of evaluating the attenuation of a fiber optic cable, and indicating malfunctions occurred in the transmitting equipment from those due to a broken fiber optic.

Advantageously, the electro-optical measuring devices 3, 3" of this invention can be implemented in a highly compact form on a single miniaturized module or single integrated circuit, thereby facilitating their installation within telecommunications networks and making for reduced cost and bulk.

The electro-optical measuring devices 3 and 3" can be implemented with hybrid technology, using optical component and semiconductor circuit chips integrated on an alumina or silicon substrate.

In particular, the optical splitter 15 and optical coupler 26 can be implemented with "fused fiber" technology, to afford very low insertion loss attenuations approximating theoretical design values.

Where a silicon substrate is used, the optical splitter 15 and optical coupler 26 may be implemented using "optical wave guide" techniques wherein the light guides are formed on the same substrate.

To summarize, the electro-optical devices for optical power measuring and the system for monitoring fiber optic cables provided by the invention allow the attenuation through, and hence the possible deterioration of, links formed by fiber optic cables to be checked while in normal operation, without interrupting or in any way disturbing an operating signal being transmitted.

Furthermore, the electro-optical devices for optical power measuring, useful with telecommunications networks which incorporate automatic optical protection, according to this invention, can indicate malfunctions due to a broken fiber optic cable from those due to a failure in the transmitting equipment.

I claim:

1. A system for monitoring a fiber optic cable connected between optical signal transmitting and receiving equipments comprising:

a central control unit;

a bus; and first and second electro-optical devices for measuring optical power being both connected to the central control unit over the bus and permanently connected to the beginning and the end, respectively, of the fiber optic cable in proximity of said transmitting and receiving equipments.

2. A monitoring system according to claim 1, further comprising:

a first plurality of optic inputs connected to an output of said transmitting equipment and to said fiber optic cable, a second plurality of optic outputs connected to said fiber optic cable and to an input of said receiving equipment; and first and second pluralities of electric inputs and electric outputs connected to said bus.

3. A monitoring system according to claim 2, further comprising:

coupling resistors, and measuring devices connected to said bus;

wherein said coupling resistors separate each useful signal present on the bus from a supply current able to remotely power said measuring devices.

4. A method of monitoring a fiber optics link established between optical signal transmitting and receiving equipments, being of the type which provides a measurement of the operating optical power attenuation through the fiber optics link, said method comprising the step of measuring power attenuation as the ratio between optical power fractions picked up on the transmit and receive ends according to a predetermined fixed splitting ratio.

5. A monitoring method according to claim 4 and implemented by a monitoring system comprised of first and second electro-optical measuring devices permanently connected to the beginning and the end of the fiber optics link, at optical signal transmitting and receiving equipment, and connected to a central control unit over a bus, said method comprising:

interrogating the electro-optical measuring devices to supply, to an electric input, a binary code identifying the measuring device;

supplying, to an electric output connected to the central control unit, first and second binary codes respectively corresponding to the first and the second optical power fraction as measured at the point where the electro-optical measuring device is connected, and the identification code of the answering device; and evaluating the attenuation of the fiber optics link as the ratio between the transmit optical power fraction measured by the first electro-optical measuring device and the receive optical power fraction measured by the second electro-optical measuring device.

6. A monitoring method according to claim 5, wherein the exchange of information with the central control unit takes place through a transmit protocol processor circuit and a receive protocol processor, both processors using a protocol of the HDLC type.

7. A monitoring method according to claim 5, wherein said interrogation step includes a polling or an interrupt procedure.

8. A monitoring method according to claim 4 and adapted to be applied even when an automatic protection for the optical safety in a network of fiber optics links is operated, characterized in that, with no operating optical power on the fiber optics link, an auxiliary power of lower level than the operating power is input to the link to discriminate among normal operation, fiber optics link failure and transmitting equipment failure;

wherein said normal operation is characterized by the received optical power fraction having a value close to that of a fraction of the operating power obtained in conformity with the splitting ratio RR;

wherein said fiber optics link failure is characterized by not receiving the optical power fraction; and further wherein said transmitting equipment failure is characterized by the received optical power fraction having a reduced value determined by the auxiliary optical power.

9. A monitoring method according to claim 8 and implemented by a monitoring system comprised of first and second electro-optical measuring devices permanently connected to the beginning and the end of the fiber optics link, at optical signal transmitting and receiving equipment, and connected to a central control unit over a bus, wherein said first electro-optical measuring device comprises a mean power detector connected to an auxiliary optical source adequate to supply said auxiliary optical power.

10. A monitoring method according to claim 9, wherein said mean power detector turns on said auxiliary optical source whenever no operating optical power is present on the fiber optics link.

11. A monitoring method according to claim 4, wherein said fiber optics link comprises a fiber optic cable.

12. A monitoring method according to claim 4, wherein said fiber optics link is of the bidirectional type and comprises a pair of fiber optic cables connected between corresponding pairs of optical signal transmitting and receiving equipments.

13. A monitoring method according to claim 12, wherein said bidirectional link has a unidirectional point-to-point configuration.

14. A monitoring method according to claim 12, wherein said bidirectional fiber optic connection has a unidirectional point-to-multipoint configuration.

15. A compact electro-optical device for measuring the operating optical power of a fiber optic cable, having an optic input and optic output as well as an electric input and electric output and being of the type which comprises an optical power measuring circuit having an input connected to said optic input and an output connected to said electric output, comprising:

an optical splitter connected between said optic input and said optic output and having a secondary output connected, through an electro-optical detector, to said optical power measuring circuit, said optical splitter being operative to split on said secondary output a fraction of the operating optical power according to a predetermined splitting ratio, and said fraction of the operating optical power being processed by the optical power measuring circuit and presented at the electric output of said circuit.

16. A device according to claim 15, wherein the output of said optical power measuring circuit is connected to an analog-to-digital converter operative to convert the value of the optical power fraction to a binary code which is transmitted to the electric output along with a further binary code identifying the measuring device.

17. A device according to claim 16, wherein said binary codes are transmitted through a transmit protocol processor circuit connected to a receive protocol processor connected, in turn, to said electric input for receiving the identification binary code.

18. A device according to claim 15, wherein said optical splitter is connected to said optical power measuring circuit through a pre-amplifier.

19. A device according to claim 15, further comprising a remote-powering circuit operative to generate an adequate voltage to power the electrooptical measuring device and being connected to the electric input and the electric output through first and second blocking resistors, respectively.

20. A device according to claim 15, wherein said optical splitter performs a division of the optical power present on the optic input to the optic output and the secondary output in a splitting ratio of 90:10.

21. A device according to claim 18, wherein said electro-optical detector is a high-sensitivity type and said pre-amplifier is a high-impedance type.

22. A device according to claim 15, wherein said optical splitter has an additional insertion loss lower than 0.25 dB.

23. A device according to claim 19 and of a type which remains active even after an automatic optical safety for a network of fiber optic cables has been operated, further comprising an optical coupler connected between the optical splitter and the optic output and connected to said optical power measuring circuit, said optical coupler adding an auxiliary optical power signal, whose level lies below a danger threshold, to the operating power signal being propagated through the fiber optic cable.

24. A device according to claim 23, wherein said optical coupler is connected to an auxiliary optical source in turn connected to the output of the measuring circuit through a mean power detector.

25. A device according to claim 24, wherein said Auxiliary optical source is a low-power optical transmitter LED or low-power laser.

26. The monitoring system in accordance with claim 1 wherein said first and second electro-optical devices are the same.

27. The monitoring method of claim 5 wherein said first and second electro-optical measuring devices are the same.

* * * * *